Sept. 7, 1926.
F. WILCOX
1,598,950
GROUNDING DEVICE FOR ELECTRIC CURRENT
Filed May 8, 1925
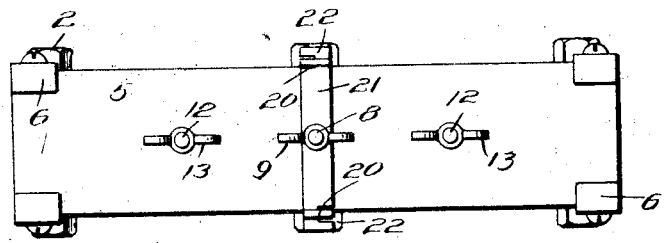
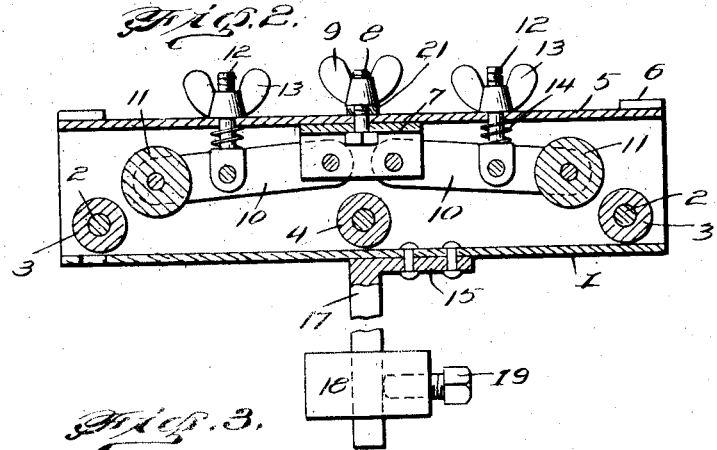
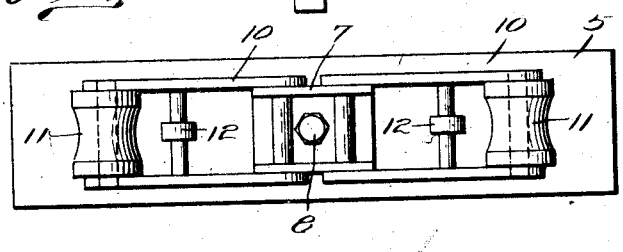
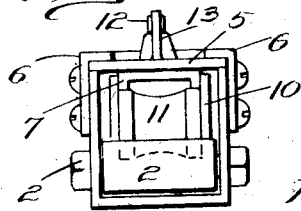
Inventor
Frank Wilcox.
By
Clarence O'Brien.
Attorney Patented Sept. 7, 1926.

1,598,950

UNITED STATES PATENT OFFICE.

FRANK WILCOX, OF GREEN BAY, WISCONSIN.

GROUNDING DEVICE FOR ELECTRIC CURRENT.

Application filed May 8, 1925. Serial No. 28,845.

This invention relates to an improved device which is adapted for grounding electric current accidentally permitted to pass through a cable, wire, or its equivalent during the course of insulation thereof.

In laying cables, and particularly when paying out the cables from a reel and carrying it to various destinations, it is not infrequent for the cable to come in contact with a live wire, thereby permitting accidental passage of current through the cable and frequently bringing about injurious results.

The present invention relates to a device which is intended to be placed upon the cable while it is being drawn out, the device being constructed to promptly short circuit and ground current accidentally passed through the cable.

The invention possesses numerous changes and advantages, and these will be made apparent by the following description and drawing.

In the accompanying drawing forming a part of this aplication and in which like numerals are employed to designate like parts throughout the same:

Figure 1 is a top plan view of a safety grounding device constructed in accordance with the present invention.

Figure 2 is a central longitudinal section through the same with portions shown in elevation.

Figure 3 is a bottom plan view of a removable cover plate.

Figure 4 is an end elevation of the device.

Referring to the drawings in detail, the reference character 1 designates an open ended channel shaped box through which the moving cable is adapted to pass. Journaled upon shafts 2 in this box adjacent the opposite ends are rollers 3, there also being a similar roller 4 at the center of the box. Removably fitted upon the open top of the box is a cover plate 5 held in place by suitably constructed retaining members 6, these retaining members being themselves removable. Disposed upon the under side of the cover plate, and located within the box is a U-shaped member 7 held in place by a bolt 8 equipped with a thumb nut 9. This member 7 serves as a pivotal mounting for a pair of duplicate carriers 10 on the outer ends of which grooved rollers 11 are journaled for rotation. It will be observed that these rollers 11 are located adjacent the end rollers 3, and in practice the cable is adapted to travel between these opposed pairs of rollers. Adjusting bolts 12 are connected to central cross pins on the carriers and other thumb nuts 13 are screwed upon these bolts to permit the rollers 11 to be lifted upwardly against the tension of the springs 14 interposed between the cover plate and carriers and surrounding the bolts 12. Fastened by a right angular extension 15 to the underside of the bottom of the box is a depending leg 17 upon which a balancing weight 18 is mounted and held in place by a set screw 19. A pair of notched arms 20 are fastened to the side walls of the box and the notched ends extend above the cover. A strip 21 is rotatably mounted upon the central bolt 8 and has its ends 22 notched as shown for cooperation with the notched ends of the arms 20. The strip 21 is engaged with the arms as shown in Figure 1 to hold the cover in place. By turning the strip around, and disengaging it, the cover may be slid through the aforesaid guides and retaining brackets 6.

In practice, the slidable cover plate is removed and the cable is laid upon the rollers 3 and 4 at the bottom of the box. Then the cover is slid back into place and engaged with the retaining bracket 6. This brings the rollers 11 down upon the top of the cable and forces it into tight yieldable contact with the first named rollers. All of the parts of the device are of electricity conducting material. The latch 21 is now moved to opposite position to positively hold the cover in place. An appropriate wire or the like is connected with the device to ground the current, or to conduct the current to a ground. The ground may be a telephone wire, a lightning arrester, a stake driven into the ground or the like. Inasmuch as the device may be maintained in suspension at times, the weight 18 serves as a counter-balancing means or ballast to hold it properly in position. In fact the set screw employed here may be used as a binding post for connecting a ground wire with a depending leg 17. However, as before stated, the current may be taken off in any suitable manner.

Attention is called to the fact that all of the parts of the device are of themselves separate elements and are detachably connected in place so that in case of breakage any part can be readily replaced. This renders the device practical, very easy to assemble, and inexpensive to both the manufacturer and the user. The safety feature of the device cannot be overestimated, because with the device on a cable, and with the cable being drawn out from a reel, drum or the like, it may come into contact with a live wire, but with this device on the cable, the current will be shunted through the device and carried down to the ground and damage thus prevented. The yieldable pivotal mounting of the roller carriers is such as to maintain the rollers thereon in constant yieldable contact with the cable and to compensate for irregularities in the cable itself. These and other features and advantages of the invention will be appreciated by those skilled in the art to which the invention relates. It is further believed that a clear comprehension of the invention will be obtained after carefully considering the description in connection with the drawings. Therefore, a more lengthy description is thought unnecessary.

While the preferred embodiment of the invention has been shown and described, it is to be understood that minor changes coming within the field of invention claimed may be resorted to if desired.

Having thus described the invention, what I claim as new and desire to secure by Letters Patent is:—

1. In a grounding device of the class described, an open ended channel shaped box provided with relatively stationary rollers over which a cable is adapted to pass, a removable cover for said box, means for fastening said cover in place, pivotally mounted carriers detachably mounted upon said cover, spring means cooperable with the carriers, rollers mounted upon said carriers and cooperable with said first named rollers.

2. In an electricity grounding device of the class described, an open ended channel shaped box provided with longitudinally spaced rollers over which a conductor cable is adapted to pass, a removable cover for the open side of the box, retaining means for said cover, a U-shaped member mounted on the underside of the cover and disposed on the interior of the box, carriers pivotally connected to said U-shaped member, rollers mounted for rotation at the outer ends of said carriers and cooperable with said first-named rollers, adjusting bolts connected with the intermediate portions of the carriers and with said cover, and spring means in association with said bolts.

In testimony whereof I affix my signature.

FRANK WILCOX.